(12) United States Patent
Lee et al.

(10) Patent No.: US 7,569,628 B2
(45) Date of Patent: Aug. 4, 2009

(54) STYRENIC THERMOPLASTIC RESIN BLEND

(75) Inventors: Sung-Ho Lee, Yeosu (KR); Chan-Hong Lee, Daejeon (KR); Yong-Yeon Hwang, Daejeon (KR); Ki-Young Nam, Yeosu (KR); Tae-Hak Kim, Daegu (KR)

(73) Assignee: LG Chem, Ltd. (KR)

( * ) Notice: Subject to any disclaimer, the term of this patent is extended or adjusted under 35 U.S.C. 154(b) by 133 days.

(21) Appl. No.: 11/767,656

(22) Filed: Jun. 25, 2007

(65) Prior Publication Data

US 2007/0259999 A1  Nov. 8, 2007

Related U.S. Application Data

(63) Continuation of application No. 10/482,426, filed as application No. PCT/KR02/01682 on Sep. 5, 2002, now Pat. No. 7,235,597.

(30) Foreign Application Priority Data

Sep. 27, 2001 (KR) .................. 10-2001-0060253
Aug. 29, 2002 (KR) .................. 10-2002-0051428

(51) Int. Cl.
*C08K 5/521* (2006.01)
*C08K 5/523* (2006.01)
*C08L 25/08* (2006.01)
*C08L 51/04* (2006.01)
*C08L 61/06* (2006.01)

(52) U.S. Cl. .............. 524/120; 524/77; 524/504; 524/507; 524/509; 524/515; 524/565; 524/577; 525/66; 525/77; 525/80; 525/392; 525/395

(58) Field of Classification Search ............... 524/120, 524/77, 504, 507, 509, 515, 565, 577; 525/66, 525/77, 80, 392, 395
See application file for complete search history.

(56) References Cited

U.S. PATENT DOCUMENTS 5,605,962 A * 2/1997 Suzuki et al. .............. 525/70
5,900,446 A * 5/1999 Nishihara et al. .......... 524/127
6,093,760 A * 7/2000 Nishihara et al. .......... 524/145

* cited by examiner

*Primary Examiner*—Kelechi C Egwim
(74) *Attorney, Agent, or Firm*—Cantor Colburn LLP

(57) ABSTRACT

The present invention relates to a styrenic thermoplastic resin composition, and more particularly to a styrenic thermoplastic resin composition comprising a non-halogen flame-retardant having superior flame-retarding properties and impact strength.

The present invention provides a flame-retarding styrenic thermoplastic resin composition comprising a) 100 weight parts of a base resin comprising i) 10 to 50 weight parts of a rubber-modified styrene-containing graft copolymer, ii) 5 to 20 weight parts of phenol novolac resin, and iii) 20 to 70 weight parts of a styrene-containing copolymer; and b) 5 to 20 weight parts of an aromatic phosphate. In addition, the a) base resin may further comprise iv) 10 to 40 weight parts of a thermoplastic polyurethane resin.

10 Claims, No Drawings

STYRENIC THERMOPLASTIC RESIN BLEND

BACKGROUND OF THE INVENTION (a) Field of the Invention

The present invention relates to a styrenic thermoplastic resin composition, particularly to a styrenic thermoplastic resin composition comprising a non-halogen flame retardant having superior flame-retarding properties and impact strength.

(b) Description of the Related Art

Rubber-modified styrene resin has superior processability and physical properties. In addition, it has superior appearance and impact strength and thus it is largely used for electric and electronic appliances and office appliances. When used for electric and electronic appliances and office appliances, a great deal of heat is produced and there is a danger of fire, and thus the resin used should have flame-retarding properties. Therefore, many studies for imparting flame-retarding properties to rubber-modified styrenic resin having flammable properties have been conducted.

As a result of many studies over a long period of time, it is known that the use of halogen compounds as flame retardants is the most effective method to make rubber-modified styrenic resin flame retardant. Also, it is known that tetrabromobisphenol A and brominated epoxy, etc. are the most commonly used halogen containing flame-retardants, and that antimony compounds have synergistic effects for flame-retarding properties.

However, halogen compounds are known to produce gases corroding metallic parts during processing, and to decompose during firing to discharge toxic gases that are noxious to the human body. Particularly, brominated compounds are criticized and restricted around Europe because they may produce environmental hormones that are noxious to the human body, such as dioxins or furans when combustion. Antimony compounds are also classified as toxic material.

Accordingly, studies of flame retardant resin compositions that do not use halogen compounds and antimony have attracted a great deal of attention. Because it is difficult for rubber-modified styrenic resin to have superior flame-retarding properties if using a non-halogen flame retardant, the development of methods for blending polycarbonate and rubber-modified styrenic resins have been attempted many times. However, a blend of polycarbonate/rubber-modified styrenic resin can achieve the desired flame retardant properties only if 70 wt % or more of polycarbonate is used. Also, if polycarbonate is used such a high level, advantages of rubber-modified styrenic resin cannot be utilized and it becomes unfavorable in terms of processability and economy.

In addition, red phosphorus or expandable graphite can be used in the resin composition in order to make rubber-modified styrenic resin flame retardant without using a polycarbonate. But, in this case, physical properties are inferior and only a dark colored product can be prepared.

SUMMARY OF THE INVENTION

The present invention is made in consideration of the problems of the prior art, and it is an object of the present invention to provide a styrenic thermoplastic resin composition comprising a non-halogen flame retardant having superior flame-retarding properties and impact strength.

In order to achieve the object, the present invention provides a flame-retarding styrenic thermoplastic resin composition comprising:
 a) 100 weight parts of a base resin comprising
  i) 10 to 50 weight parts of a rubber-modified styrene-containing graft copolymer;
  ii) 5 to 20 weight parts of phenol novolac resin; and
  iii) 30 to 70 weight parts of a styrene-containing copolymer; and
 b) 5 to 20 weight parts of an aromatic phosphate.

Preferably, the present invention provides a flame-retarding styrenic thermoplastic resin wherein the a) base resin further comprises 10 to 40 weight parts of a iv) thermoplastic polyurethane resin.

DETAILED DESCRIPTION AND THE PREFERRED EMBODIMENTS

The present invention will now be explained in detail.

The present invention blends a small amount of a thermoplastic polyurethane resin and phenol novolac resin instead of a polycarbonate so as to maintain advantages of a rubber-modified styrenic resin, and uses aromatic phosphate as a flame-retardant, thereby obtaining a thermoplastic resin composition having superior physical properties of flame-retarding and impact strength.

(Rubber-Modified Styrene-Containing Graft Copolymer)

The rubber-modified styrene-containing graft copolymer used in the present invention is obtained by grafting a compound comprising 30 to 65 weight parts of at least one of styrene, α-methylstyrene, and nuclear substitution styrene; and 10 to 30 weight parts of at least one of acrylonitrile, methylmethacrylate, and butylacrylate, to 10 to 60 weight parts of rubber. Examples of the rubber include polybutadiene, a styrene-butadiene copolymer, polyisoprene, a butadiene-isoprene copolymer, etc. The graft copolymer resin can be prepared by a common polymerization method, but it is preferably synthesized by mass polymerization and emulsion polymerization. Particularly, acrylonitrile/butadiene/styrene (ABS) resin wherein acrylonitrile and styrene are grafted on butadiene rubber is preferable.

The rubber-modified styrene-containing graft copolymer comprises a base resin together with thermoplastic polyurethane resin, a styrene-containing copolymer, and phenol novolac resin, and it is used in an amount of 10 to 50 weight parts of the total base resin. If the contents of the rubber-modified styrene-containing graft copolymer are less than 10 weight parts, physical properties including impact strength decrease, and if it exceeds 50 weight parts, processability decreases and rigidity and hardness become lower.

(Thermoplastic Polyurethane Resin)

The thermoplastic polyurethane resin used in the present invention is a general polymer produced by a polymer addition reaction of a multi-functional isocyanate and a compound having two or more hydroxyl groups. Therefore, the thermoplastic polyurethane resin may include bonds other than a urethane bond, such as urea, amide, biuret, allophanate, ether, ester, etc. bonds.

The thermoplastic polyurethane resin comprises a base resin together with a rubber-modified styrene-containing graft copolymer, a styrene-containing copolymer, and phenol novolac resin, and it is used in an amount of 10 to 40 weight parts of the total base resin. If the contents of the thermoplastic polyurethane resin are less than 10 weight parts, flame-retarding properties may decrease, and if it exceeds 40 weight parts, processability will be decreased.

(Phenol Novolac Resin)

The phenol novolac resin used in the present invention is obtained by reacting phenols and formalin in the presence of an acidic catalyst. It has a structure of the following Chemical Formula 1, and it is used in an amount of 5 to 20 weight parts of the total base resin. If the contents of the phenol novolac resin are less than 5 weight parts, it shows no flame-retarding properties, and if it exceeds 20 weight parts, processability decreases.

[Chemical Formula 1]

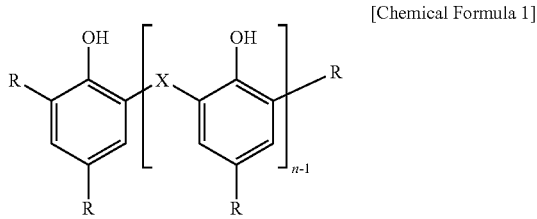

(wherein X is $CH_2$, $CH_2CH_2$, $CHCH_3$, CO, or $SO_2$; each of R is independently or simultaneously a hydrogen atom, a halogen atom, a $C_{1-20}$ alkyl group, an aryl group, $NO_2$, CN, Si, or a hydroxyl group; and n is an integer of 1 or more, showing degree of polymerization)

(Styrene-Containing Copolymer)

The styrene-containing copolymer used in the present invention comprises 50 to 90 weight parts of at least one of styrene, α-methylstyrene, and nuclear substitution styrene; and 10 to 50 weight parts of at least one of acrylonitrile, methylmethacrylate, and butylacrylate. The graft copolymer resin can be prepared by a common polymerization method, but it is suitably synthesized by mass polymerization or emulsion polymerization. The styrene-containing copolymer is used in an amount of 30 to 70 weight parts of the total base resin according to the amount of rubber-modified styrene-containing graft copolymer, thermoplastic polyurethane, and phenol novolac resin.

(Flame-Retardant Aromatic Phosphate)

As the aromatic phosphate used as a flame-retardant in the present invention, an aromatic monophosphate and an aromatic diphosphate can be used alone or in combination.

The aromatic monophosphate includes a trialkylphosphate such as trimethylphosphate, triethylphosphate, tributylphosphate, trioctylphosphate, etc.; a triarylphosphate such as triphenylphosphate, tricresylphosphate, trixylylphosphate, cresyldiphenylphosphate, etc.; and a trialkyl-arylphosphate such as octyldiphenylphosphate, etc., which is not substituted with a halogen. Preferably, triarylphosphate is used, and more preferably, triphenylphosphate, tri(4-methylphenyl)phosphate, or tri(2,6-dimethylphenyl)phosphate is used.

In addition, the aromatic diphosphate is preferably a compound of the following Chemical Formula 2 or pentaerythrityl diphosphate (PPP) of the following Chemical Formula 3:

[Chemical Formula 2]

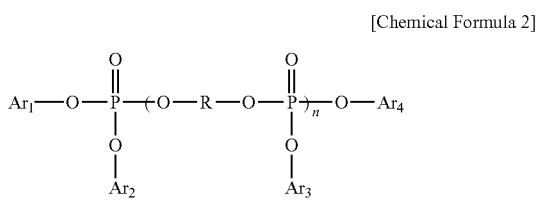

(wherein $Ar_1$~$Ar_4$ is a phenyl group or an aryl group substituted with 1~3 C1-4 alkyl groups, R is phenyl or bisphenol A, and n is 4 or 5, showing degree of polymerization.)

[Chemical Formula 3]

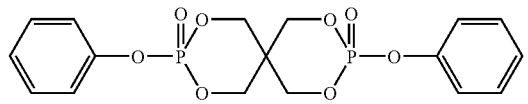

The aromatic monophosphate and aromatic diphosphate are preferably added in an amount of 5 to 20 weight parts of 100 weight parts of the total base resin, alone or in combination. If the contents of the flame-retardant are less than 5 weight parts, flame-retarding properties decrease, and if 20 weight parts are exceeded, the flame-retarding properties are superior but processability and other physical properties such as impact strength decrease.

The composition of the present invention may further comprise an additive selected from the group consisting of a lubricant, a thermostabilizer, an antioxidant, a light stabilizer, an anti-dripping agent, a pigment, an inorganic filler, and a mixture thereof.

The flame-retarding styrenic thermoplastic resin composition of the present invention can be prepared by a common blending method.

The present invention will be explained in more detail with reference to the following Examples. However, these are to illustrate the present invention and the present invention is not limited to them.

EXAMPLE

Preparation and specification of raw material used in Examples are as follows:

(Rubber-Modified Styrene-Containing Graft Copolymer)

The rubber-modified styrene-containing graft copolymer resin is an LG Chemical Inc. product, acrylonitrile/butadiene/styrene, which is prepared by grafting acrylonitrile and styrene on butadiene rubber, comprising 30 weight parts of styrene, 15 weight parts of acrylonitrile, and 50 weight parts of butadiene rubber, and which is synthesized by emulsion polymerization.

(Thermoplastic Polyurethane Resin)

The thermoplastic polyurethane resin is prepared by reacting adipic acid, glycol, and diisocyanate. Adipic acid and an excessive amount of a mixture of ethylene glycol and polypropylene glycol are reacted to prepare polyester, which is reacted with diisocyanate to prepare a compound having a urethane structure. To 100 g of the compound, 1 g of water was added and heated, and the obtained solid powder is heated to 150° C. under a pressure of 100 atm. to obtain thermoplastic polyurethane resin.

(Phenol Novolac Resin)

Phenol novolac resin is prepared by synthesizing a compound of the structure of the above Chemical Formula 1 wherein x is 0, an average degree of polymerization is 5, and a softening point is 130° C. One mole each of phenol and formalin are introduced into a reactor, and 1.5 g of oxalic acid is added as a catalyst to cause reaction at 97° C., for 12 hours. After reaction, the mixture is separated into resin and water. After removing the water, the pressure is reduced again, the resin is dehydrated by heating at 180° C. for 1 hour, and it is cooled to obtain a solid phenol novolac resin.

(Styrene-Containing Copolymer)

The styrene-containing copolymer comprises 70~80 weight parts of styrene and 20~30 weight parts of acrylonitrile, and is synthesized by emulsion polymerization.

(Aromatic Phosphate)

As an aromatic monophosphate, triphenylphosphate (TPP) from Japan Daihachi Company was used. As an aromatic diphosphate, diphenylphosphate (PX-200) from Japan Daihachi Company and synthesized pentaerythrityl diphosphate (PPP) from LG Chemical, Ltd. were used.

Example 1

A flame-retarding thermoplastic resin was prepared with the composition and contents as shown in Table 1. 10 weight parts of phenol novolac resin was blended with styrenic resin, and aromatic monophosphate, TPP was used in an amount of 15 weight parts of 100 weight parts of the total resin as a flame-retardant.

Example 2

A flame-retarding thermoplastic resin composition was prepared with the composition and contents as shown in Table 1 by the same method as in Example 1, except that aromatic diphosphate, PX-200 was used in an amount of 15 weight parts of 100 weight parts of the total base resin, instead of aromatic monophosphate, TPP as a flame-retardant.

Example 3

A flame-retarding thermoplastic resin composition was prepared with the composition and contents as shown in Table 1 by the same method as in Example 1, except that pentaerythrityl diphosphate, PPP was used in an amount of 15 weight parts of 100 weight parts of the total base resin, instead of aromatic monophosphate, TPP as a flame-retardant.

Example 4

A flame-retarding thermoplastic resin composition was prepared with the composition and contents as shown in Table 1 by the same method as in Example 1, except that aromatic monophosphate, TPP and aromatic diphosphate, PX-200 were used respectively in an amount of 10 weight parts and 5 weight parts of 100 weight parts of the total base resin as a flame-retardant.

For the samples prepared in Examples 1~4, the flame-retarding properties were measured according to the UL94 VB flammability test method, and the results are shown in Table 1.

Evaluation Standard for Flame-Retarding Properties
SE: Self-extinguish, NR: No Rating

TABLE 1

|  |  |  | Example | | | |
|---|---|---|---|---|---|---|
|  |  |  | 1 | 2 | 3 | 4 |
| Base resin (weight parts) | Rubber-modified styrene-containing graft copolymer | ABS | 35 | 35 | 35 | 35 |
|  | Phenol novolac resin |  | 10 | 10 | 10 | 10 |
|  | Styrene-containing copolymer | SAN | 55 | 55 | 55 | 55 |
| Flame-retardant | Aromatic monophosphate | TPP | 10 | — | — | 5 |

TABLE 1-continued

|  |  |  | Example | | | |
|---|---|---|---|---|---|---|
|  |  |  | 1 | 2 | 3 | 4 |
| (Weight part) | Aromatic diphosphate | PX-200 | — | 10 | — | 5 |
|  |  | PPP | — | — | 10 | — |
| Physical properties | UL94 (⅛″) |  | SE | SE | SE | SE |
|  | Average combustion time (t1 + t2) |  | 65 | 88 | 71 | 72 |

Example 5

As shown in Table 2, 20 weight parts of rubber-modified styrene-containing graft copolymer, 10 weight parts of thermoplastic polyurethane resin, and 10 weight parts of novolac resin were blended with 60 weight parts of styrene-containing copolymer, and aromatic monophosphate, TPP was added thereto as a flame-retardant in an amount of 10 weight parts of 100 weight parts of the total resin to prepare a flame-retarding resin composition.

Example 6

A flame-retarding resin composition was prepared by the same method as in Example 5, except that the amount of aromatic monophosphate, TPP was increased to 15 weight parts of 100 weight parts of the total resin.

Example 7

A flame-retarding resin composition was prepared by the same method as in Example 5, except that as a flame-retardant, aromatic diphosphate, PX-200 was used in an amount of 15 weight parts of 100 weight parts of the total resin instead of aromatic monophosphate, TPP.

Example 8

A flame-retarding resin composition was prepared by the same method as in Example 5, except that as a flame-retardant, aromatic diphosphate, PPP was used in an amount of 15 weight parts of 100 weight parts of the total resin instead of aromatic monophosphate, TPP.

Example 9

A flame-retarding resin composition was prepared by the same method as in Example 5, except that as a flame-retardant, on the basis of 100 weight parts of total resin, 8 weight parts of aromatic monophosphate, TPP and 5 weight parts of aromatic diphosphate, PX-200 were used.

Example 10

A flame-retarding resin composition was prepared by the same method as in Example 5, except that among the total base resin, the amount of thermoplastic polyurethane resin was decreased to 20 weight parts and that of the styrene-containing copolymer was decreased to 50 weight parts; and as the flame-retardant, aromatic monophosphate, TPP was used in an amount of 12 weight parts of the total resin.

Example 11

A flame-retarding resin composition was prepared by the same method as in Example 10, except that among the total base resin, the amount of styrene-containing graft copolymer was decreased to 25 weight parts and that of the styrene-containing copolymer was decreased to 45 weight parts.

Example 12

A flame-retarding resin composition was prepared by the same method as in Example 10, except that among the total base resin, the amount of thermoplastic polyurethane resin was increased to 30 weight parts and that of the styrene-containing copolymer was decreased to 40 weight parts.

Table 2 shows the composition of Examples 5 to 12 and results of measuring impact strength and flame-retarding properties of prepared samples. Impact strength was measured as notched izod impact strength according to ASTM D-256, and flame-retarding properties were measured according to the UL94 VB flammability test standard.

TABLE 2

| | | | Examples | | | | | | | |
|---|---|---|---|---|---|---|---|---|---|---|
| | | | 5 | 6 | 7 | 8 | 9 | 10 | 11 | 12 |
| Base resin (weight parts) | Rubber-modified styrene-containing graft copolymer | ABS | 20 | 20 | 20 | 20 | 20 | 20 | 25 | 20 |
| | Polyurethane | | 10 | 10 | 10 | 10 | 10 | 20 | 20 | 30 |
| | Phenol novolac | | 10 | 10 | 10 | 10 | 10 | 10 | 10 | 10 |
| | Styrene-containing copolymer | SAN | 60 | 60 | 60 | 60 | 60 | 50 | 45 | 40 |
| Flame-retardant (weight part) | Aromatic monophosphate | TPP | 10 | 15 | — | — | 8 | 12 | 12 | 12 |
| | Aromatic diphosphate | PX-200 | — | — | 15 | — | 5 | — | — | — |
| | | PPP | — | — | — | 15 | — | — | — | — |
| Physical properties | Impact strength (¼") | | 22 | 19 | 18 | 17 | 20 | 23 | 26 | 28 |
| | UL94 (⅛") | | V-1 | V-1 | V-1 | V-1 | V-1 | V-0 | V-0 | V-0 |

In Examples 5 to 9, when blending 10 weight parts of novolac resin and 10 weight parts of thermoplastic polyurethane resin with the styrene copolymer and using 10 weight parts or more of aromatic phosphate on the basis of 100 weight parts of the total resin, compositions showed UL-94 V-1. Also, although impact strength varied according to the kinds of aromatic phosphate, the compositions showed the same flammability.

In addition, in Examples 10 to 12, when increasing the amount of polyurethane resin to 20 weight parts or more, the composition showed a flammability of UL-94 V-0, and when the rubber-modified styrene-containing graft copolymer or thermoplastic polyurethane resin was increased, the impact strength increased without change in flammability.

As explained, according to the present invention, a non-halogen styrenic thermoplastic flame-retarding resin composition having superior flame-retarding properties and impact strength can be prepared by adding small amounts of novolac resin and thermoplastic polyurethane resin to a rubber-modified styrenic resin.

What is claimed is:

1. A styrenic thermoplastic resin composition, without polycarbonate or polyphenylene ether, comprising
   a) 100 weight parts of a base resin, by weight of the base resin:
   i) 10 to 50 weight percent (wt. %) of a rubber-modified styrene-containing graft copolymer comprising 30 to 65 weight parts of a styrene compound and 10 to 30 weight parts of an acryl compound on 10 to 60 weight parts of a rubber, which the styrene compound is selected from the group consisting of a styrene, α-methylstyrene, nuclear substitution styrene, and a mixture thereof, and the acryl compound is selected from the group consisting of an acrylonitrile, methylmethacrylate, butylacrylate, and a mixture thereof, and the rubber is selected from the group consisting of polybutadiene, styrene-butadiene copolymer, polyisoprene, butadiene-isoprene copolymer, and a mixture thereof;
   ii) 5 to 20 wt. % of phenol novolac resin;
   iii) 30 to 70 wt. % of a styrene-containing copolymer comprising 50 to 90 wt % of a compound selected from the group consisting of styrene, α-methylstyrene, nuclear substitution styrene, and a mixture thereof; and 10 to 50 wt % of a compound selected from the group consisting of acrylonitrile, methylmethacrylate, butylacrylate, and a mixture thereof; and
   iv) 10 to 40 wt. % of a thermoplastic polyurethane resin, and
   b) 5 to 20 weight parts of a combination comprising a phosphorous compound represented by the following Chemical Formula 3:

[Chemical Formula 3]

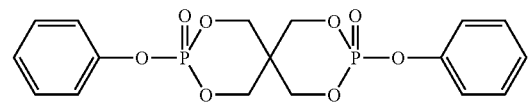

and a phosphorous compound not identical to Chemical Formula 3, selected from the group consisting of aromatic phosphate, aliphatic phosphate, and a mixture thereof, which is not substituted with halogen.

2. The styrenic thermoplastic resin composition according to claim 1 wherein the thermoplastic polyurethane resin is prepared by addition reaction polymerizing a compound having two or more hydroxyl groups with a multifunctional isocyanate.

3. The styrenic thermoplastic resin composition according to claim 1, wherein the a) ii) phenol novolac resin is a compound represented by the following Chemical Formula 1:

[Chemical Formula 1]

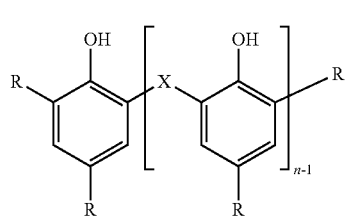

wherein

X is $CH_2$, $CH_2CH_2$, $CHCH_3$, CO, or $SO_2$;

each of R is independently or simultaneously a hydrogen atom, a halogen atom, a $C_{1-20}$ alkyl group, an aryl group, $NO_2$, CN, Si, or a hydroxyl group; and n is an integer of 1 or more, showing degree of polymerization.

4. The styrenic thermoplastic resin composition according to claim 1, wherein the aromatic phosphate is an aromatic monophosphate, an aromatic diphosphate, or a mixture thereof.

5. The styrenic thermoplastic resin composition according to claim 4, wherein the aromatic monophosphate is selected from a group consisting of: a triarylphosphate; a trialkyl-arylphosphate; and a mixture thereof, which is not substituted with halogen.

6. The styrenic thermoplastic resin composition according to claim 5, wherein the triarylphosphate is selected from the group consisting of triphenylphosphate, tricresylphosphate, trixylylphosphate, and cresyldiphenylphosphate; and the tri-alkyl-arylphosphate includes octyldiphenylphosphate.

7. The styrenic thermoplastic resin composition according to claim 4, wherein the aromatic diphosphate is a compound represented by the following Chemical Formula 2:

[Chemical Formula 2]

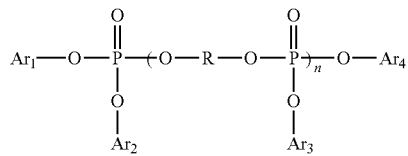

wherein $Ar_1$~$Ar_4$ are phenyl groups or aryl groups substituted with 1~3 C1-4 alkyl groups;

R is a phenyl or a bisphenol A; and n is 4 or 5, showing degree of polymerization.

8. The styrenic thermoplastic resin composition according to claim 4, wherein the aliphatic phosphate is a trialkylphosphate selected from the group consisting of trimethylphosphate, triethylphosphate, tributylphosphate, and trioctylphosphate; and a mixture thereof, which is not substituted with halogen.

9. The styrenic thermoplastic resin composition according to claim 1, wherein the thermoplastic resin further comprises an additive selected from the group consisting of a lubricant, a thermostabilizer, an antioxidant, a light stabilizer, an anti-dripping agent, a pigment, an inorganic filler, and a mixture thereof.

10. A styrenic thermoplastic resin composition, without polycarbonate, consisting essentially of:
   a) 100 weight parts of a base resin, by weight of the base resin:
      i) 10 to 50 weight percent (wt. %) of a rubber-modified styrene-containing graft copolymer comprising 30 to 65 weight parts of a styrene compound and 10 to 30 weight parts of an acryl compound on 10 to 60 weight parts of a rubber, which the styrene compound is selected from the group consisting of a styrene, α-methylstyrene, nuclear substitution styrene, and a mixture thereof, and the acryl compound is selected from the group consisting of an acrylonitrile, methylmethacrylate, butylacrylate, and a mixture thereof, and the rubber is selected from the group consisting of polybutadiene, styrene-butadiene copolymer, polyisoprene, butadiene-isoprene copolymer, and a mixture thereof;
      ii) 5 to 20 wt. % of phenol novolac resin;
      iii) 30 to 70 wt. % of a styrene-containing copolymer comprising 50 to 90 wt % of a compound selected from the group consisting of styrene, α-methylstyrene, nuclear substitution styrene, and a mixture thereof; and 10 to 50 wt % of a compound selected from the group consisting of acrylonitrile, methylmethacrylate, butylacrylate, and a mixture thereof; and
      iv) 10 to 40 wt. % of a thermoplastic polyurethane resin, and
   b) 5 to 20 weight parts of a combination comprising a phosphorous compound represented by the following Chemical Formula 3:

[Chemical Formula 3]

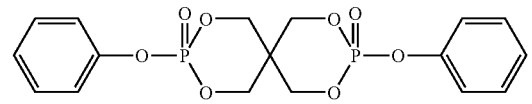

and a phosphorous compound not identical to Chemical Formula 3, selected from the group consisting of aromatic phosphate, aliphatic phosphate, and a mixture thereof, which is not substituted with halogen.

* * * * *